(12) United States Patent
Bauer et al.

(10) Patent No.: US 9,088,177 B2
(45) Date of Patent: Jul. 21, 2015

(54) ADAPTIVE POWER SUPPLY

(75) Inventors: Hans-Achim Bauer, Hamburg (DE); Andre Zybala, Hanstedt (DE)

(73) Assignee: Airbus Operations GmbH (DE)

( * ) Notice: Subject to any disclaimer, the term of this patent is extended or adjusted under 35 U.S.C. 154(b) by 695 days.

(21) Appl. No.: 13/127,128

(22) PCT Filed: Nov. 4, 2009

(86) PCT No.: PCT/EP2009/064653
§ 371 (c)(1),
(2), (4) Date: May 2, 2011

(87) PCT Pub. No.: WO2010/052258
PCT Pub. Date: May 14, 2010

(65) Prior Publication Data
US 2011/0210607 A1   Sep. 1, 2011

Related U.S. Application Data

(60) Provisional application No. 61/198,183, filed on Nov. 4, 2008.

(30) Foreign Application Priority Data

Nov. 4, 2008 (DE) .......................... 10 2008 055 811

(51) Int. Cl.
| B60L 1/00 | (2006.01) |
|---|---|
| B60L 3/00 | (2006.01) |
| H02G 3/00 | (2006.01) |
| H02J 1/08 | (2006.01) |
| H02J 3/00 | (2006.01) |
| H02J 4/00 | (2006.01) |

(52) U.S. Cl.
CPC ... *H02J 1/08* (2013.01); *H02J 3/00* (2013.01); *H02J 4/00* (2013.01)

(58) Field of Classification Search
CPC ............... H02J 1/10; H02J 1/102; H02J 7/35; H02J 7/00; H02J 3/14; H02J 3/00; H02J 1/00; Y02E 60/12; G06F 1/26; G06F 19/00; B60L 1/00; B64D 15/12
USPC ............. 307/10.1, 66, 18, 147, 104; 700/292, 700/291; 701/3, 29, 117; 323/234; 244/118.5; 340/425.5; 363/125
See application file for complete search history.

(56) References Cited

U.S. PATENT DOCUMENTS

| 4,723,079 A | 2/1988 | Norton |
|---|---|---|
| 5,568,370 A | 10/1996 | Goldstein et al. |

(Continued)

FOREIGN PATENT DOCUMENTS

| DE | 102005047011 A1 | 4/2007 |
|---|---|---|
| DE | 102006028823 A1 | 1/2008 |
| EP | 0409226 A2 | 1/1991 |

*Primary Examiner* — Rexford Barnie
*Assistant Examiner* — Jagdeep Dhillon
(74) *Attorney, Agent, or Firm* — Lerner, David, Littenberg, Krumholz & Mentlik, LLP (57) ABSTRACT

A voltage supply unit for providing an adaptive voltage supply to a consumer in a means of transport, wherein the voltage supply unit comprises a voltage output device and an output control device. The output control device and the voltage output device are designed to set an output voltage of the voltage supply unit adaptively in a consumer-dependent manner.

12 Claims, 4 Drawing Sheets

(56) References Cited

U.S. PATENT DOCUMENTS

| | | | |
|---|---|---|---|
| 7,105,947 B1* | 9/2006 | Marshall et al. | 307/28 |
| 8,005,580 B2* | 8/2011 | McAvoy | 701/3 |
| 8,103,387 B2* | 1/2012 | Gothard | 700/286 |
| 2003/0085621 A1 | 5/2003 | Potega | |
| 2007/0296273 A1 | 12/2007 | Reitmann et al. | |
| 2010/0102625 A1* | 4/2010 | Karimi et al. | 307/9.1 |
| 2010/0282910 A1* | 11/2010 | Stothers et al. | 244/134 D |

\* cited by examiner

ADAPTIVE POWER SUPPLY

CROSS-REFERENCE TO RELATED APPLICATIONS

This application is a national phase entry under 35 U.S.C. §371 of International Application No. PCT/EP2009/064653, filed Nov. 4, 2009, published in German, which claims the benefit of the filing date of German Patent Application No. 10 2008 055 811.7 filed Nov. 4, 2008, and of U.S. Provisional Patent Application No. 61/198,183 filed Nov. 4, 2008, the disclosures of which applications are hereby incorporated herein by reference.

TECHNICAL FIELD

The invention relates to an adaptive voltage supply. In particular, the invention relates to a voltage supply unit for providing an adaptive voltage supply of a consumer in a means of transport. Furthermore, the invention relates to an aircraft and to a consumer, designed as an illuminating unit or as an aircraft passenger seat, comprising such a voltage supply unit.

BACKGROUND TO THE INVENTION

Figure 1:
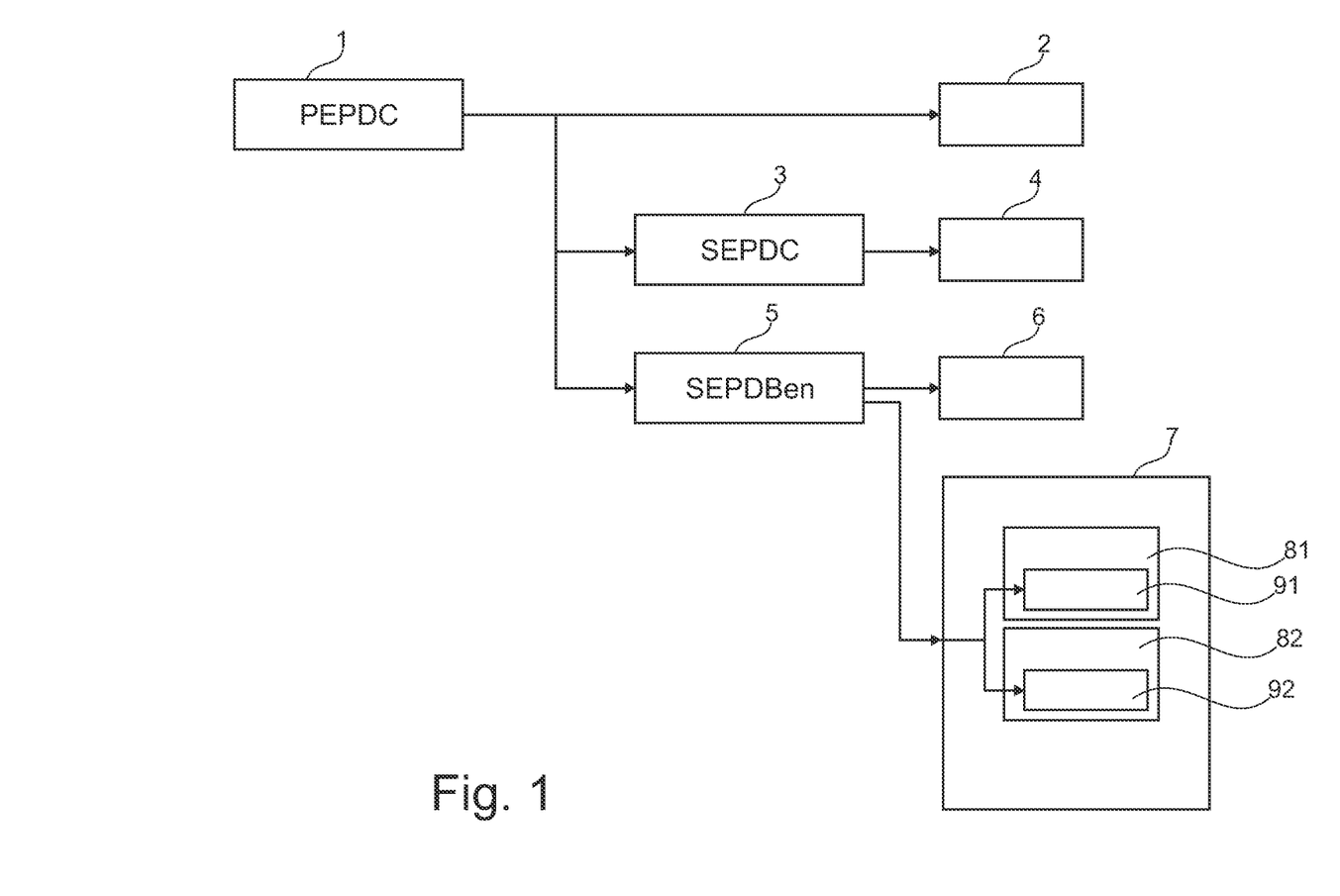
FIG. 1 shows an exemplary diagrammatic view of a system with voltage supply units.

Known voltage supply systems cause the distribution and provision of voltage for devices in an aircraft cabin. Distribution of the generated voltage takes place by way of a central primary electrical power distribution centre (PEPDC). Loads with very high output values, for example galleys, are supplied directly by way of the PEPDC. Technical loads are connected by way of further distribution centres, the secondary electrical power distribution centres (SEPDCs). The loads in the cargo region and the consumers in the cabin are in turn supplied by way of special secondary power distribution boxes (SPDBs), as shown in FIG. 1. In relation to the voltage supply, two standard values are used in aircraft, namely 28 VDC and 115 VAC with a frequency of 300 to 800 Hz. Each device generates its specific supply voltage by means of an AC/DC converter or DC/DC converter, which results in power loss for each consumer.

From DE 10 2006 028 823 A1 and US 2007/0296273 A1 a current supply network with integrated undervoltage protection in a passenger aircraft with a current supply comprising several output connections is known, to which in each case a supplier is connected in each case with one of the several output connections by way of a main voltage supply line. Each one of the several consumers comprises a voltage sensor for acquiring the supply voltage, and a load control device. The voltage sensor and the load control device are integrated in the consumer and regulate the supply voltage relating to the consumer.

By integrating an AC/DC converter or DC/DC converter in the consumer or by arranging the converters upstream of the consumer, a multitude of electronic circuits are necessary in order to generate the specific supply voltage for each consumer. This results in comparatively heavy weight and in power loss in relation to each consumer, thus reducing the ecological benefit of the aircraft. Furthermore, in the case of failure or malfunction of the converter of a consumer it is necessary to first identify the consumer concerned, and then to exchange or replace the converter in an elaborate and expensive manner.

SUMMARY OF THE INVENTION

It may be considered an object of the invention to provide an improved flexible voltage supply for consumers in a means of transport.

It should be noted that the exemplary embodiments of the invention that are described below equally relate to the voltage supply unit, to the consumer (e.g. aircraft passenger seat, illumination, media), to the aircraft and to the method.

If in this document there is a reference to "voltage supply", this may also refer to a power supply and/or energy supply.

According to an exemplary embodiment, a voltage supply unit for providing an adaptive voltage supply of a consumer in a means of transport is provided, with the voltage supply unit comprising: a voltage output device; an output control device; wherein the output control device and the voltage output device are designed to set an output voltage of the voltage supply unit adaptively in a consumer-dependent manner.

Such a voltage supply device can be designed as a secondary flexible power distribution unit (SFPDU) and has the ability to set its output voltage flexibly according to the requirement of a consumer or device. As a result of this functionality, consumers that are connected to the voltage supply unit are no longer forced to conform to the two known standard aircraft voltages of 28 VDC and 115 VAC, but instead can be designed so as to be more flexible and better optimised according to the respective application. Consequently, consumers or devices no longer need to be supplied by way of successively coupled AC/DC converters or DC/DC converters, but instead they are supplied, by means of a converter in the voltage output device, with a voltage that is dependent on the operating voltage required by the individual consumer. Circuit components in the consumer, for example a converter, may be done without or may be reduced so that significant savings in weight and expenditure can be made. The voltage conditioning on a central position, for example the SFPDU, makes possible a more effective circuit design than is implemented with the individual solutions in the consumers. In this manner the power loss can be reduced.

Such a voltage supply unit is designed, by means of a flexible voltage supply, to adjust to the requirements of connected consumers/devices, thus making it possible to improve the operating efficiency of an aircraft.

Such a central voltage supply unit makes it possible to achieve optimal adaptation of the current distribution to the consumers such as elements of the cabin management system (control units, lighting devices, operating elements and display elements) or aircraft seats in the aircraft. In this arrangement, if the consumer, for example an aircraft seat, does not consume any current, for example when a passenger is asleep in the aircraft seat, a standby mode of the consumer can be set. In this standby mode the consumer is only fed a minimal voltage that supplies a circuit component of the consumer, which circuit component is required for switching devices on and off. Thus only those consumers are supplied with a voltage greater than the minimal supply voltage, which consumers require/consume more output or power.

Such a voltage supply unit makes it possible, in the case of a state of emergency in the aircraft, for example in the case of a failure of a main generator or some other supply systems, for the consumers to be able to be supplied with a preset voltage of a particular level. The emergency scenario with preset supply voltages guarantees operation of the systems that are vital to passengers. In this context it is, for example, also possible to fall back onto the integrated emergency voltage-supply units if the main voltage supply fails.

The voltage supply unit can be designed in such a manner that each consumer is connected to a converter that is integrated in the voltage supply unit or that several consumers which, for example, require the same supply voltage, are grouped to form a class and are only connected to one converter that is integrated in the voltage supply unit.

According to an exemplary embodiment of the invention, the output control device is connected to the voltage output device and for controlling the voltage output device is designed in such a manner that the output voltage is set on the basis of a signal communicated by the consumer.

Such control of the voltage output device by the voltage supply unit on the basis of a signal communicated by the consumer/device makes it possible for each consumer to be able to request an individual operating voltage from the voltage supply unit and thus to be able to be optimally supplied. The voltage supply unit/secondary flexible power distribution unit (SFPDU) is informed by the consumer as to which device-specific operating voltage is to be set. In this way it becomes possible to adjust the output voltage of a current supply/distribution for each consumer in a manner that depends on the operating state.

According to an exemplary embodiment of the invention, the voltage supply unit is designed to dynamically control the output voltage according to the requirements of the consumer.

Such regulation of the output voltage by means of the voltage supply unit on demand makes it possible to supply each consumer precisely with the voltage that said consumer requires at a particular point in time. Consequently the power loss at the consumers can be reduced.

According to an exemplary embodiment, the voltage supply unit is designed to dynamically control the output voltage on demand from the consumer after a main voltage supply of the means of transport has been switched on.

Such a voltage supply unit makes it possible for output voltages, on the device side, of the voltage supply unit/SFPDU now no longer having to be statically preset, but instead, after the main voltage supply has been switched on, also being able to take place dynamically (power on demand) in relation to each consumer. Setting the output voltage can take place prior to installation of the voltage supply unit/SFPDU manufacturing process of the SFPDU, or during operation on demand by the connected consumer/device to be supplied.

According to an exemplary embodiment of the invention, the voltage supply unit is designed to supply several consumers or consumer groups by way of a supply line.

Such a voltage supply unit makes it possible for a voltage output device in the voltage supply unit, for example a converter, to handle the voltage supply in relation to several consumers/devices of an identical class of consumers. This makes it possible to reduce weight and power loss by means of a reduction in the circuit components in the voltage supply unit.

According to an exemplary embodiment, the voltage supply unit is designed to set the output voltage during operation of the voltage supply unit on demand from the connected consumer.

Such a voltage supply unit makes it possible for a consumer to communicate its requirement for voltage to the voltage supply unit and to receive precisely this requirement from the voltage supply unit.

According to an exemplary embodiment, the voltage supply unit is designed to output an activation voltage to the consumer, by means of which activation voltage a circuit of the consumer is activated, whereupon the consumer transmits the signal back to the voltage supply unit.

Such a voltage supply unit makes it possible for communication between the voltage supply unit and the consumer to take place simultaneously in such a manner that a consumer is continuously supplied with an activation voltage that makes it possible for said consumer, by way of a circuit that is supplied or activated by the activation voltage, to transmit information/signals back to the voltage supply unit. The information/signals can, for example, determine the device-specific operating voltage that is required by the consumers.

According to an exemplary embodiment of the invention, a voltage supply unit for communication with the consumer is implemented by way of the supply line.

Such a supply line makes it possible to communicate, by way of the supply line, information relating to the requirement of a specific consumer-dependent voltage supply to the voltage supply unit, and also makes it possible for the voltage supply unit to simultaneously transmit the required consumer-dependent operating voltage to the consumer.

According to an exemplary embodiment, the voltage supply unit further comprises an emergency voltage supply, wherein the emergency voltage supply is connected to the voltage output device so that in the case of failure of the main voltage supply the consumer can be supplied by way of the emergency voltage supply so that important functions of the consumer can be maintained.

Such a voltage supply unit with an emergency voltage supply makes it possible for the voltage supply unit to at all times supply adequate voltage to consumers, for example in order to, during failure of other voltage supply sources during an emergency scenario, supply the functions of the consumer which functions are vital to passengers. For example, in the case of turbine damage and the failure of the main current supply the necessary supply of light to passengers can, for example, be achieved by means of an emergency illumination system.

According to an exemplary embodiment, the means of transport in which the voltage supply unit has been implemented is an aircraft.

According to an embodiment of the invention, a consumer for connection to a voltage supply unit is stated, with the consumer comprising: an input control device for determining a voltage required by the consumer, and for communicating with the voltage supply unit.

Such a consumer with an input control device makes it possible for an activation voltage applied to the consumer to cause communication between the power supply unit and the consumer.

Such a consumer with an input control device makes it possible for information relating to the required voltage to be communicated to the voltage supply unit, wherein in an emergency the voltage supply unit can evaluate this information and can take suitable measures to ensure operational safety.

According to a further exemplary embodiment of the invention, the voltage supply unit is designed to evaluate information relating to a required supply voltage of the consumer in an emergency situation, and to provide preset supply voltages to operate the systems that are vital to passengers in the means of transport.

The term "emergency situations" may refer to situations in which a main generator of the means of transport fails, for example as a result of turbine damage or a defect in a fuel supply device, a battery or some other supply device. Further emergency situations may include a loss of pressure in the cabins of the aircraft, or failure of circuit systems of the supply electronics or of the supply systems of the aircraft.

The term "emergency situation" may furthermore relate to the failure or to faulty functioning of power supply units of the aircraft, or may occur during failure or faulty functioning of distributor units for distributing the generated power to supply systems of the aircraft. For example, a primary electrical power distribution centre (PEPDC) of the aircraft may fail or may function in a faulty manner so that loads with very high output values, for example galleys, are not supplied or are supplied only inadequately. Furthermore, secondary electrical power distribution centres (SEPDCs) of the aircraft may fail or may function in a faulty manner so that supply systems connected thereto cannot be operated or can be operated only inadequately. In the case of a failure or faulty functioning of secondary power distribution boxes (SPDBs) of the aircraft, the systems in the cargo hold region and the consumer systems in the cabin, which systems are both connected to said SPDBs, can often not be supplied or can be supplied only inadequately.

In such emergency situations, consumers, such as, for example, the vital systems for passengers of the aircraft, for example the oxygen masks, the illumination to the emergency exits, or the pressure equalisation system in the cabin, require a defined supply voltage.

The voltage supply unit can determine the defined supply voltages relating to the respective consumers for each emergency situation in that the voltage supply unit evaluates information relating to the required voltage of the consumers in an emergency situation.

Evaluation can include the voltage supply unit receiving and storing the required supply voltage for each consumer and in each emergency situation during an emergency situation, as well as comparing it with already stored supply voltages for each consumer and each emergency situation, and adjusting it to new preset supply voltages for each consumer, which supply voltages are optimised in terms of safety and energy management. The already existing stored supply voltages can be based on calibration of the voltage supply unit in the factory, or can be defined by means of simulated emergency situations after installation of the voltage supply unit in the aircraft. In particular, the supply voltages can differ from emergency to emergency, depending on requirements.

Supply voltages stored for emergency situations by the voltage supply unit can be adjusted and optimised in term of the energy consumption, for example by simulation of emergency situations in the aircraft. To this effect, data relating to the supply voltage is received, stored and compared by the voltage supply unit, whereupon adjustment of the necessary or pre-set supply voltage of consumers in the respective emergency situations takes place by means of the voltage supply unit. Evaluating information in an emergency situation thus, for example, relates to the documentation of required supply voltages for each consumer in particular emergency situations, the comparison of this emergency situation to a preset supply voltage for operating the consumer in the emergency situation, and the balancing or calibration of the preset supply voltages relating to the consumers in the emergency situation.

Evaluation of the information by way of a required supply voltage of the consumer in the above-described emergency situations by the voltage supply unit makes it possible to optimise, in terms of energy consumption and safety, the preset supply voltages required for operating the consumers, or the supply voltages required for the systems that are vital to passengers in the means of transport.

The voltage supply unit is designed to undertake suitable measures relating to the safety of operation on the basis of the evaluated information by way of a required supply voltage of the consumer in an emergency situation. For example, the voltage supply unit is designed to provide preset supply voltages for operating the systems that are vital to passengers in the aircraft.

Further measures can, for example, in the case of inadequate available supply voltage for all systems, involve switching off non-vital systems and providing preset supply voltages for operating vital systems. Furthermore, the voltage supply unit can prioritise consumers by means of evaluating information relating to a required supply voltage of the consumers in an emergency situation, and in the case of an emergency situation can, for example, provide only the preset supply voltages of the systems that are absolutely essential to passengers in the means of transport, for example operation of oxygen masks during a pressure decrease in the aircraft.

Suitable measures relating to the safety of operation on the basis of the evaluated information concerning a required supply voltage of the user in an emergency situation can relate to safeguarding the lines or the distributor units to which the consumer systems are connected. Such safeguarding can, for example, take place in that in an emergency situation the voltage supply unit provides only a particular preset voltage supply to the lines or the distributor units.

According to an exemplary embodiment, the consumer is designed as an illumination unit or as an airplane passenger seat.

For example, the input control device for determining the voltage required by the consumer, and the circuit of the consumer for transmitting signals to the voltage supply unit, can be coupled to the control system of the airplane passenger seat.

According to a further exemplary embodiment of the invention, the voltage supply unit can provide preset determined supply voltages in relation to each consumer of the means of transport. The voltage supply unit can, for example, be calibrated at the factory prior to installation in the means of transport in such a manner that required voltage supplies relating to each consumer of the means of transport, and if applicable to each encountered situation, for example takeoff, climbing flight, cruising, descent, approach, landing, missed approach, overshoot, waiting procedure, parking position, emergency situation, are stored in the voltage supply unit.

According to a further exemplary embodiment of the invention, the voltage supply unit is designed to verify the supply voltage relating to each consumer. During installation in the means of transport, or during connection to the consumers, the voltage supply unit can verify or monitor whether in relation to each consumer the supply voltage required by the consumer is provided, and subsequently can initiate the voltage supply to the consumers.

According to a further exemplary embodiment of the invention, the voltage supply unit for providing a standard supply voltage to the consumers is designed to activate the consumers when the voltage supply unit is switched on. The standard voltage can comprise the lowest voltage of all the consumers to be supplied, in order to ensure that no consumer is damaged. In this way it is, furthermore, possible to optimise the power loss of the consumers.

According to a further exemplary embodiment of the invention, the voltage supply unit is designed to incrementally increase a supply voltage. Such incremental increase of the supply voltage makes it possible, for example, to optimise the power loss. The voltage supply unit can provide defined output voltage values that make it possible for the voltage supply unit to be optimised for the respective output voltage, whereby the intrinsic losses are reduced.

According to an exemplary embodiment, an aircraft comprising a voltage supply unit according to the invention is provided.

This measure provides a flexible voltage supply by way of the voltage supply unit which adjusts to the requirements of connected consumers/devices, whereby an increase in the operating efficiency of the aircraft is made possible. It is thus possible, for example, for each individual passenger to be supplied with voltage according to their individual supply requirements by the voltage supply unit so that voltage loss that would occur in the case of generally identical voltage supply to all airplane passenger seats is reduced, and thus an increase in the operating efficiency of the aircraft is made possible.

According to an exemplary embodiment, a method for providing an adaptive voltage supply to a consumer in a means of transport is provided, with the method comprising the steps of: adaptive consumer-dependent setting of an output voltage of a voltage supply unit by means of an output control device and a voltage output device.

According to an exemplary embodiment, moreover, a method is provided that furthermore comprises the following steps: providing an activation voltage to the consumer; receiving a signal from the consumer; wherein adaptively setting the output voltage takes place on the basis of the signal.

The individual characteristics of the various exemplary embodiments can of course also be combined, as a result of which, in part, advantageous effects may arise which exceed the sum of the individual effects, even if said advantageous effects are not expressly described.

These and other aspects of the invention are explained and illustrated by reference to the exemplary embodiments described hereafter.

BRIEF DESCRIPTION OF THE DRAWINGS

Below, exemplary embodiments are described with reference to the following drawings.

DETAILED DESCRIPTION OF EXEMPLARY EMBODIMENTS

Below, exemplary embodiments of the invention are described with reference to the enclosed drawings.

The illustrations in the figures are diagrammatic and not to scale. In the following description of the figures the same reference characters are used for identical or similar elements.

FIG. 1 shows a diagrammatic view of several voltage supply units 1, 3, 5 that are connected to different consumers 2, 4, 6. Distribution of the generated voltage takes place by way of a central primary electrical power distribution centre (PEPDC) 1. Loads with high voltage values 2, for example galleys, are supplied directly by way of the PEPDC 1. Technical loads 4 are connected by way of further distribution centres, the secondary electrical power distribution centres (SEPDC) 3. Loads in the cargo region 6 and the consumers in the cabin 7 are supplied by way of special secondary power distribution boxes (SPDBs) 5. Each consumer in the cabin 7 comprises one or several devices 81, 82, in which in each case an associated converter 91, 92 is integrated.

To provide the voltage supply, the voltage supply units PEPDC 1, SEPDC 3 and SPDBs 5 provide the standard values of 28 VDC and 115 VAC with a frequency of 300 to 800 Hz. By means of AC/DC converters or DC/DC converters 91, 92, each device 81, 82 generates its specific supply voltage, which results in a multitude of electronic circuits which as a result of their weight and power loss reduce the ecological benefit of the aircraft.

Figure 2:
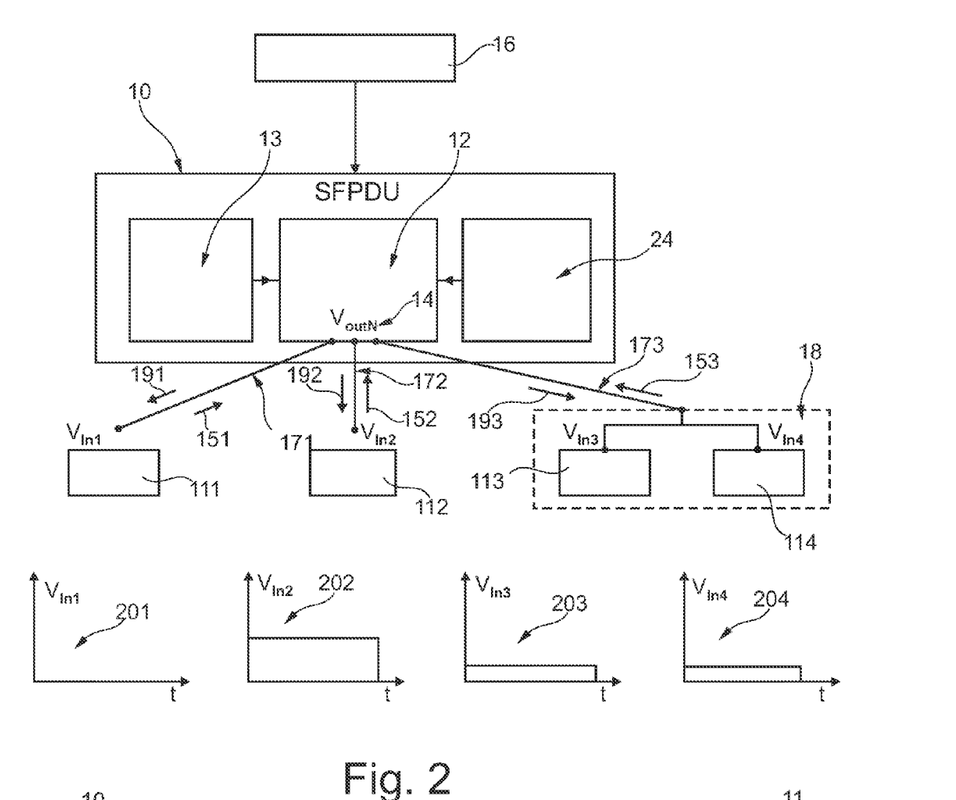
FIG. 2 shows a diagrammatic view of a voltage supply unit with a main voltage supply as well as several consumers or consumer groups according to an exemplary embodiment of the invention, and in each case a voltage/time diagram for each of these consumers.

FIG. 2 shows a diagrammatic view of a voltage supply unit/secondary flexible power distribution unit (SFPDU) 10 according to the invention, whose input voltage is designed for a standardised main voltage supply 16. The voltage supply unit/SFPDU 10 comprises an output control device 13 that is connected to a voltage output device 12. As an option it is also possible to connect an emergency voltage supply 24 to the voltage output device 12, which emergency voltage supply 24 in the case of failure of the main voltage supply 16 supplies the necessary voltage for operating the voltage supply unit 10. By way of supply lines 171, 172 the voltage output device 12 is in each case connected to a consumer 111, 112, and by way of a supply line 173 is connected to a consumer group 18 that can comprise one or several consumers 113, 114. The voltage output device 12 applies an output voltage VoutN 14 to the supply lines 171, 172, 173 which are connected to the consumers 111, 112 or to the consumer group 18 that can comprise one or several consumers 113, 114, so that in each case a consumer-specific input voltage Vin1, Vin2, Vin3, Vin4 is present at the consumers 111, 112, 113, 114, as shown in relation to each consumer 111, 112, 113, 114 in the voltage/time diagrams 201, 202, 203, 204.

The consumers 111, 112 or the consumer group 18 in each case transmit signals 151, 152, 153 by way of the supply lines 171, 172, 173 to the voltage output device 12, on the basis of which signals 151, 152, 153 the output voltage 14 relating to the consumers 111, 112, 113, 114 is set. An activation voltage 191, 192, 193, 19 activates the respective consumers 111, 112, 113, 114 in such a manner that in each case they can transmit signal 151, 152, 153 to the voltage supply unit 10.

Figure 3:
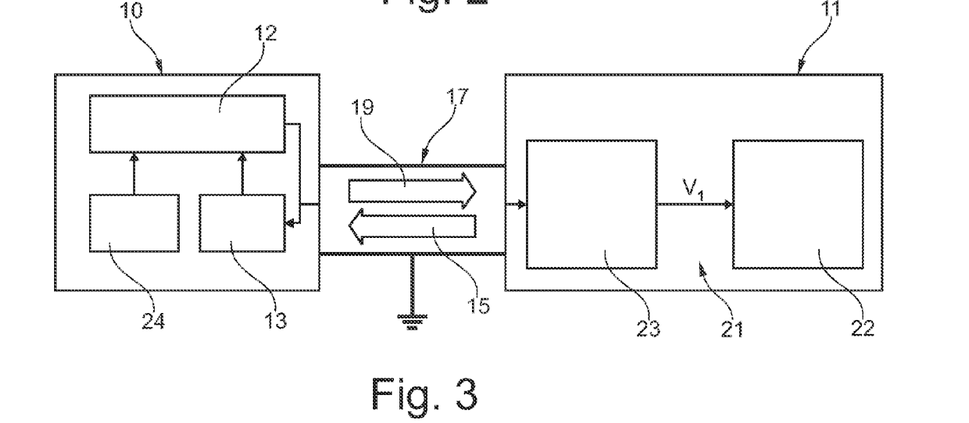
FIG. 3 shows a diagrammatic view of a voltage supply unit according to an exemplary embodiment of the invention, which voltage supply unit is connected to a consumer by way of a supply line.

FIG. 3 shows a diagrammatic view of the voltage supply unit/SFPDU 10 with the voltage output device 12, the output control device 13 and the emergency voltage supply 24. The voltage supply unit 10 and the output control device 13 are connected to a consumer 11 by way of a supply and communication line 17. The consumer comprises an input control device 23 that is activated by way of an activation voltage 19 that determines the voltage required by the consumer 11, and by way of a signal 15 communicates it to the voltage supply unit 10. Also by way of the input control device 23 the activation voltage 19 activates a circuit 21 of the consumer 11, whereupon the consumer transmits a signal 15 back to the voltage supply unit 10.

The input control device 23 is connected to a device 22 that can carry out a particular function. Furthermore, the input control device 23 compares the voltage supply V1 required by the device 22 with the voltage supply provided by the voltage supply unit 10 and regulates the supply to the device 22 in such a manner that the voltage supply unit 10 provides an adequate voltage supply V1 for the device 22.

Figure 4:
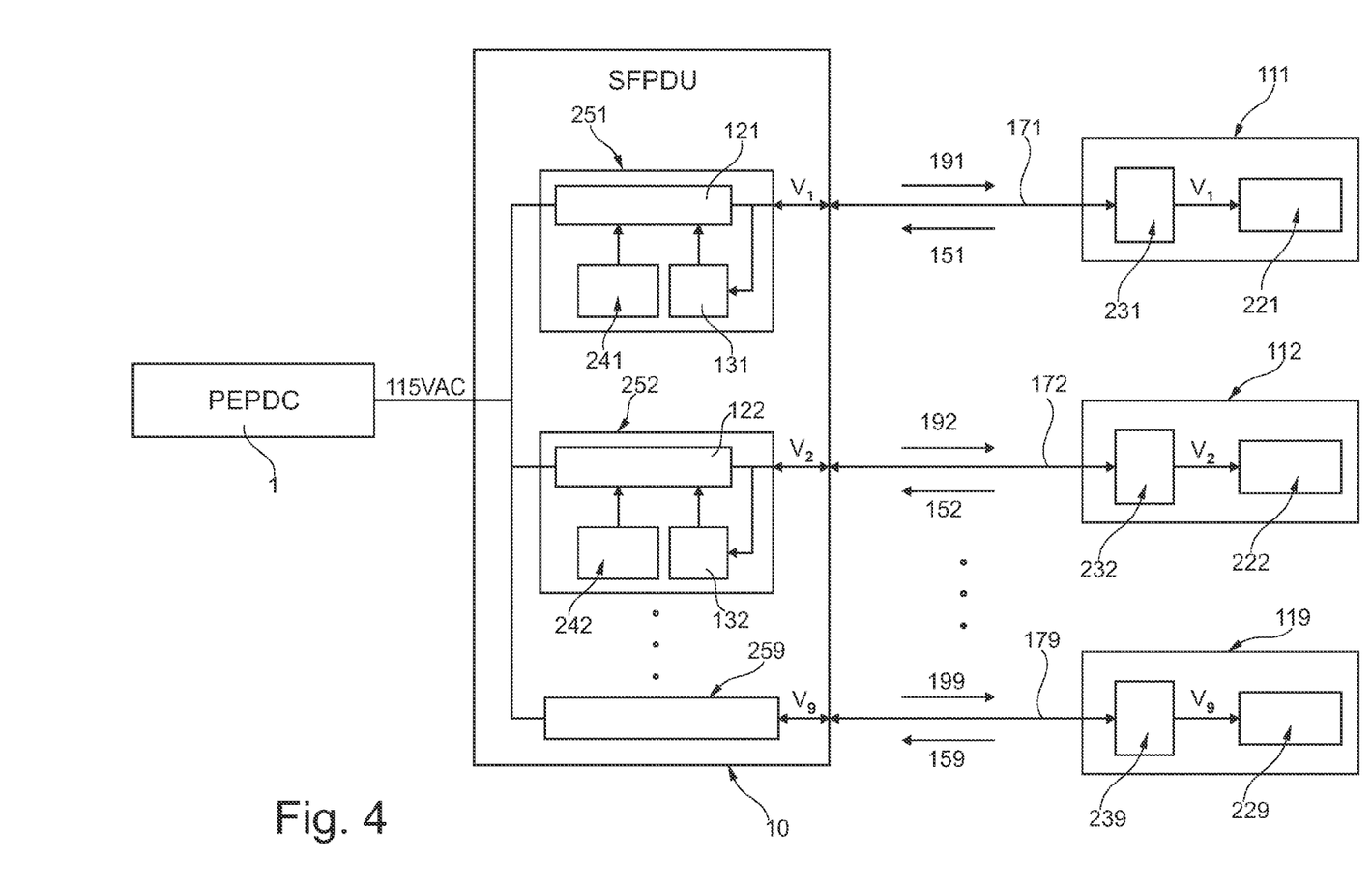
FIG. 4 shows a voltage supply unit according to an exemplary embodiment of the invention, with a primary electrical power distribution centre PEPDC and several consumers that are connected to the voltage supply unit by way of supply lines.

FIG. 4 shows a voltage supply unit/secondary flexible power distribution unit (SFPDU) 10 according to the invention, which by way of a power distribution centre (PEPDC) 1 is, for example, supplied with a voltage of 115 VAC, and by way of supply lines 171, 172, 179 is connected to consumers 111, 112, 119. The voltage supply unit/SFPDU 10 comprises one or several central converters 251, 252, 259 in which in each case a voltage output device 121, 122, 12.n, an emergency voltage supply 241, 242 and an output control device 131, 132 are integrated. Each central converter 251, 252, 259 is supplied by way of the PEPDC 1 for example with a voltage of 115 VAC. In each case the voltage output device 121, 122 of each central converter 251, 252 is connected to an emergency voltage supply 241, 242 and to an output control device 131, 132.

Each consumer 111, 112, 119 comprises a device 221, 222, 229 which by way of an input control device 231, 232, 239 in each case integrated in the consumer 111, 112, 119 is supplied with the required supply voltage V1, V2, V9.

In each case each central converter 251, 252, 259 supplies a consumer 111, 112, 119 with an activation voltage 191, 192, 199 which in each case activates the input control device 231, 232, 239 of the respective consumer 111, 112, 119 so that the respective input control device 231, 232, 239 in each case can send a signal 151, 152, 159 to the respective central converters 251, 252, 259, for example containing information relating to the consumer-specific voltage supply requirement V1, V2, V9 of the respective consumers 111, 112, 119. In each case the signals 151, 152, 159 are conveyed in a consumer-specific manner to the output control devices 131, 132 of the central converters 251, 252, 259. The output control devices 131, 132 transmit information relating to the voltage supply level required by the respective consumer 111, 112, 119 to the respective voltage output devices 121, 122 of the central converters 251, 252, 259. According to the voltage supply level required by the respective consumer 111, 112, 119, the respective voltage output device 121, 122 applies a consumer-specific operating voltage V1, V2, V9 to the respective consumer 111, 112, 119.

Figure 5:
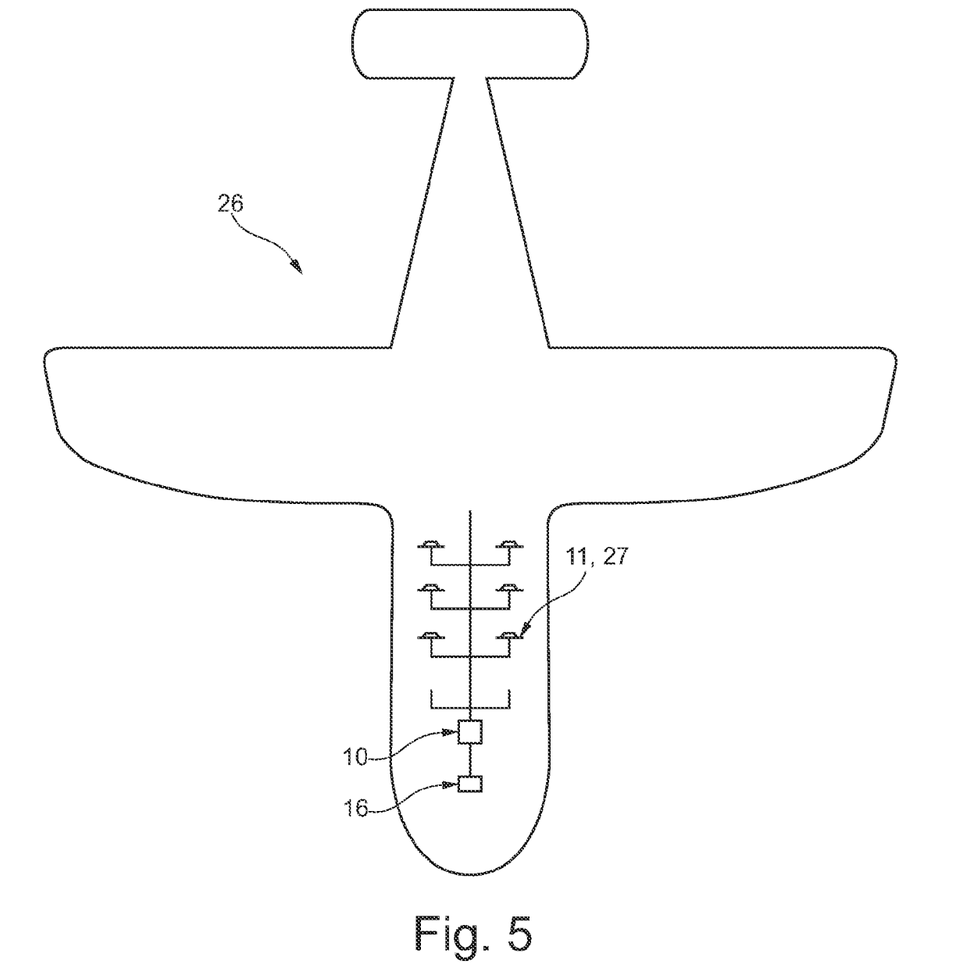
FIG. 5 shows an aircraft according to an exemplary embodiment of the invention, with a voltage supply unit, a main voltage supply unit and several consumers that are designed as aircraft passenger seats.

FIG. 5 shows an aircraft 26 comprising a main voltage supply unit 16 that is connected to a voltage supply unit 10. The voltage supply unit 10 is connected to several consumers 11 that are designed as aircraft passenger seats 27.

Figure 6:
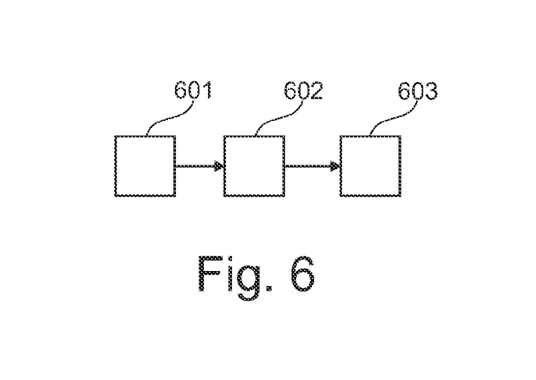
FIG. 6 shows a flow chart of a method according to an exemplary embodiment of the invention.

FIG. 6 shows a flow chart of a method according to an exemplary embodiment of the invention. The method shown basically comprises the step of adaptive consumer-dependent setting of an output voltage of a voltage supply unit by an output control device and a voltage device. In the method shown, furthermore, the following steps are shown in sequence: providing an activation voltage to the consumer 601; receiving a signal by the consumer 602; adaptively setting an output voltage on the basis of the signal 603.

It should be pointed out that the invention is not to be limited to a voltage supply but is also to comprise a power supply and/or energy supply.

Although the invention has been described with reference to exemplary embodiments, various alterations and modifications can be carried out without leaving the scope of protection of the invention. The invention can also be used in fields other than aviation, for example in trains, buses or ships or in any means of transport where likewise a voltage supply device for providing an adaptive voltage supply to a consumer is required or desired.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Primary electrical power distribution centre (PEPDC)—28 VDC; 115 VAC or only 115 VAC
2 Loads with high voltage values
3 Secondary electrical power distribution centre (SEPDC)—28 VDC; 115 VAC
4 Technical loads
5 Secondary power distribution boxes (SPDBs)—28 VDC; 115 VAC
6 Loads in the cargo region
7 Consumer in the cabin
81, 82 Device 1, 2
91, 92 Converter 1, 2
10 Voltage supply unit
11, 111, 112, 113, 114, 119 Consumer, consumer 1, 2, 3, 4, 9=n
12, 121, 122 Voltage output device, voltage output device 1, 2
13, 131, 132 Output control device 1, 2
14 Output voltage/VoutN
15, 151, 152, 153, 159 Signal, signal 1, 2, 3, 9=n
16 Main voltage supply
17, 171, 172, 173, 179 Supply line, supply line 1, 2, 3, 9=n
18 Consumer group
19, 191, 192, 19.3, 199 Activation voltage, activation voltage 1, 2, 3, 9=n
201, 202, 203, 204 Voltage/time diagram, consumer 1, 2, 3, 4
21 Consumer circuit
22, 221, 222, 229 Device, device 1, 2, 9=n
23, 231, 232, 239 Input control device, input control device 1, 2, 9=n
24, 241, 242, 249 Emergency voltage supply, emergency voltage supply 1, 2, 9=n
251, 252, 259 Central converter 1, 2, 9=n
26 Aircraft
27 Aircraft passenger seat
Vin1, Vin2, Vin3, Vin4 Input voltage 1, 2, 3, 4 of a consumer

The invention claimed is:

1. A voltage supply unit for providing an adaptive voltage supply to a multitude of consumers in an aircraft, with the voltage supply unit comprising:
   a voltage output device; and
   an output control device;
   wherein the output control device and the voltage output device are configured to set an output voltage of the voltage supply unit adaptively in a consumer-dependent manner by adjusting to the voltage requirements of the multitude of consumers;
   wherein the voltage supply unit is configured to evaluate information relating to a required supply voltage of the consumer in an emergency situation, and to provide preset supply voltages to operate systems vital to passengers in the aircraft;
   wherein each of the multitude of consumers is connected to a converter integrated in the voltage supply unit;
   wherein the voltage output device is configured such that the output voltage is set on the basis of a signal communicated by a consumer; and
   wherein each of the multitude of consumers is configured to request an individual operating voltage from the voltage supply unit.

2. The voltage supply unit of claim 1, wherein the voltage supply unit is configured for dynamically controlling the output voltage according to the requirements of each consumer.

3. The voltage supply unit of claim 1, wherein the voltage supply unit is configured to dynamically control the output voltage according to a demand of each consumer after a main voltage supply of the aircraft has been switched on.

4. The voltage supply unit of claim 1, wherein the voltage supply unit is configured to set the output voltage during operation of the voltage supply unit on demand from the multitude of connected consumers.

5. The voltage supply unit of claim 1, wherein the voltage supply unit is configured to output an activation voltage to each consumer for activating a circuit of a consumer, whereupon the consumer transmits the signal back to the voltage supply unit.

6. The voltage supply unit of claim 1, wherein the voltage supply unit is configured to communicate with the consumer by way of a supply line.

7. The voltage supply unit of claim 1, further comprising:
    an emergency voltage supply;
    wherein the emergency voltage supply is connected to the voltage output device so that, in the case of failure of a main voltage supply, the consumer is supplied with voltage by the emergency voltage supply so that important functions of the consumer are maintained.

8. The voltage supply unit of claim 1, wherein the aircraft is an airplane.

9. An aircraft comprising a voltage supply unit for providing an adaptive voltage supply to a multitude of consumers in an aircraft, with the voltage supply unit comprising:
    a voltage output device; and
    an output control device;
    wherein the output control device and the voltage output device are configured to set an output voltage of the voltage supply unit adaptively in a consumer-dependent manner by adjusting to the voltage requirements of the multitude of consumers;
    wherein the voltage supply unit is configured to evaluate information relating to a required supply voltage of a consumer in an emergency situation, and to provide preset supply voltages to operate systems vital to passengers in the aircraft;
    wherein each of the multitude of consumers is connected to a converter integrated in the voltage supply unit;
    wherein the voltage output device is configured such that the output voltage is set on the basis of a signal communicated by the consumer; and
    wherein each of the multitude of consumers is configured to request an individual operating voltage from the voltage supply unit.

10. A method for providing an adaptive voltage supply to a multitude of consumers in an aircraft, the method comprising:
    adaptive consumer-dependent setting of an output voltage of a voltage supply unit using an output control device and a voltage output device by adjusting to voltage requirements of the multitude of consumers;
    evaluating information relating to a required supply voltage of each consumer in an emergency situation;
    requesting, by each one of the multitude of consumers, an individual operating voltage from the voltage supply unit;
    setting the output voltage on the basis of a signal communicated by a consumer;
    providing preset supply voltages to operate systems vital to passengers in the aircraft and the requested individual operating voltage to the multitude of consumers.

11. The aircraft of claim 9, wherein the consumer comprises:
    an input control device for determining a voltage required by the consumer, and for communicating with the voltage supply unit.

12. The aircraft of claim 11, wherein the consumer comprises an illumination unit or an aircraft passenger seat.

* * * * *